United States Patent [19]

Dahlbring

[11] 4,261,384
[45] Apr. 14, 1981

[54] T-JOINT FITTING

[75] Inventor: Göran Dahlbring, Gothenburg, Sweden

[73] Assignee: Götaverken Motor AB, Gothenburg, Sweden

[21] Appl. No.: 59,139

[22] Filed: Jul. 20, 1979

[51] Int. Cl.³ ............................................. F16L 41/04
[52] U.S. Cl. .................................. 137/318; 29/421 E; 285/3; 285/197
[58] Field of Search ............................. 285/197, 3, 4; 29/421 E; 137/318

[56] References Cited

U.S. PATENT DOCUMENTS

| | | | |
|---|---|---|---|
| 2,083,842 | 6/1937 | Henning | 285/3 |
| 3,024,592 | 3/1962 | Leaman | 29/421 E X |
| 3,293,732 | 12/1966 | Broske | 29/421 E X |
| 3,872,707 | 3/1975 | Broske | 29/421 E X |
| 3,983,897 | 10/1976 | Gebelius | 137/318 |

FOREIGN PATENT DOCUMENTS 2729967  1/1979  Fed. Rep. of Germany ........ 29/421 E

*Primary Examiner*—Thomas F. Callaghan
*Attorney, Agent, or Firm*—Holman & Stern

[57] ABSTRACT

A T-joint fitting comprising two parts for clamping to an existing length of pipe encloses a piston, which is axially displaceable by firing of a cartridge. The piston cuts a hole in the wall of the pipe and is provided with a transverse passage, which will serve for conducting fluid from the pipe to a second passage in the fitting.

The length of the piston is selected so its front, cutting edge rests against the envelope wall of the pipe, when its back face is about level with the open end of the first passage. The cartridge is a disc-shaped shell, having about the same diameter as the portion of the housing enclosing the first passage, this portion having external threads. There is an eccentrically located socket for a firing cap at the face of the shell to be turned outwards in use.

A cup-shaped nut engaging these external threads has in its inner bottom surface a recess for reception of the cap containing socket, the recess being further adapted to make the firing cap accessible to a firing pin.

3 Claims, 3 Drawing Figures

T-JOINT FITTING

BACKGROUND OF THE INVENTION

There are T-joint fittings adapted to be attached to a length of pipe at a selected point thereof, and which encloses a piston which is axially displaceable in a passage by the firing of cartridge. The piston will cut a hole in the pipe and the piston is provided with a transverse passage, which in a final position will permit the transfer of fluid from the pipe to a second passage in the fitting, and further on to a branch pipe communicating with said second passage.

A T-joint fitting of this type is i.a. shown in U.S. Pat. No. 3,983,897 to S R V Gebelius of Stockholm, Sweden.

With earlier types of fittings the powder charges used to perform the work of cutting the hole in the pipe and of compressing the chip, so obtained, provided much higher thrust than necessary.

The present development ensures a more adequate control of the hole cutting process, which means that it will be easier to calculate the energy necessary, so excess input of powder can be avoided.

SUMMARY OF THE INVENTION

The aim of the present invention is to propose a design of the fitting, which makes possible the use of a unitary cartridge formed as a disc-shaped shell enclosing a suitable powder charge. The invention is characterized in that the disc-shaped shell in its face to be turned outwardly, in use, is provided with an excentrically located socket for a firing cap, and that the portion of the housing of the fitting enclosing the piston and the cartridge is externally threaded for cooperation with a cup-shaped nut, having in its internal bottom surface a recess for the reception of the cap socket. The length of the piston is selected so its front, cutting edge, in an initial position rests against the envelope surface of the pipe, while its back face is about level with the mouth of the passage.

The cartridge shell is preferably manufactured in two parts, of which one is made of a material, which only to a slight degree will be affected by the combustion of the powder, and which forms the outward wall with the cap socket, as well as the envelope wall of the shell, while the other part, which is turned towards the piston, is dimensioned so as to form a suitable tamping.

DESCRIPTION OF A PREFERRED EMBODIMENT

Figure 1:
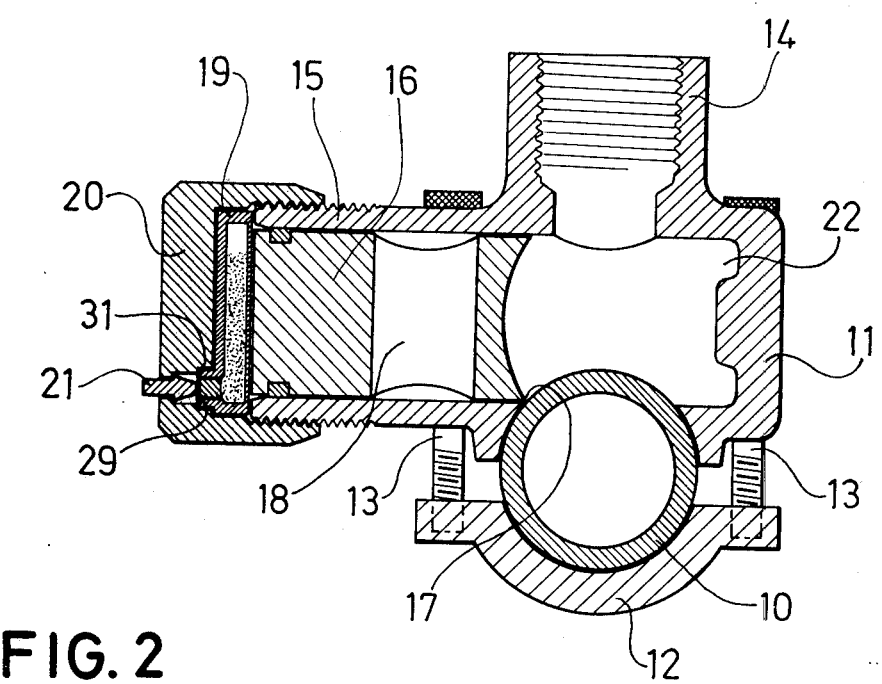
FIG. 1 is a cross section of a T-joint fitting according to the invention with the piston in its initial position.

The T-joint fitting shown in FIG. 1 is adapted to be fitted to a length of pipe 10 forming part of an existing piping system for the distribution of a fluid. The fitting basically comprises two portions, a housing 11, which contains all the parts necessary for providing a communication with pipe 10, and a clamping member 12, which by means of a number of bolts 13 may be fitted to the housing. The latter, as well as the clamping member 65 is each provided with a semi-cylindrical surface mating with the envelope wall of the pipe and a tightening of the bolts 13 will provide a satisfactory sealing against the pipe. The housing 11 is further provided with a nipple 14, which in mounted position projects substantially perpendicularly away from pipe 10, and to which the desired branch pipe will be connected.

A portion 15 of the housing extends substantially perpendicularly to nipple 14 and encloses a cylindrical passage, in which a piston 16 is axially displaceable. The front edge 17 of the piston is bowl-shaped and has a sharp edge suitable for cutting a hole in pipe 10. The piston further has a transverse passage 18, which, in the final position of the piston, will permit transfer of fluid from the passage to nipple 14.

When the fitting has been located at a selected spot at pipe 10, an axial displacement of piston 16 is brought about by firing a powder charge enclosed in a disc-shaped shell 19, which will be described more in detail in connection with FIGS. 2 and 3. The portion 15 of the housing is externally threaded, and may be closed by means of a cup-shaped nut 20, having internal threads mating with the external threads of portion 15. The nut is provided with a mounting for a firing pin denoted at 21.

When the diameter of the branch pipe is determined, and the diameter, the wall thickness and the material of pipe 10 are known it is possible to calculate the work required to cut a hole in the wall of the pipe. The passage 18 within the piston will have the same diameter as the internal diameter of the branch pipe, and it can be assumed that the diameter of piston 16 ought to have a diameter of about 150% of that of the passage. Some further work for compacting the chip obtained by cutting the hole in the pipe must also be taken into consideration. A space 22 is formed at the bottom of the piston containing passage in the portion of the housing 11, remote from portion 15. It is of course necessary to bring piston 16 to a final position, in which passage 18 will be aligned with the hole in the pipe, as well as with nipple 14.

Knowing the work deemed necessary, the magnitude of the powder charge to be enclosed in cartridge 19 may be determined. In order to obtain the best result it is of importance, that the cartridge has about the same dimension as piston 16, so a large area is obtained, against which the gases may act. It is of further importance that the front edge 17 of the piston abuts against, or very soon contacts the envelope wall of the piston, so that a definite resistance against the displacement of the piston is obtained from the beginning. An action where the piston has a possibility to accelerate over a distance before it contacts the pipe is difficult to control.

A substantial part of the cutting work is consumed just at the opening of the pipe. When the piston has cut through the nearest portion of the wall of pipe 10, the work will be reduced somewhat, until the front edge of the piston reaches the opposite side of the opening, and has to cut through the wall there. The final compacting of the chip will consume the remainder of available driving force, and is expected to brake the piston in its proper, final position.

Figure 2:
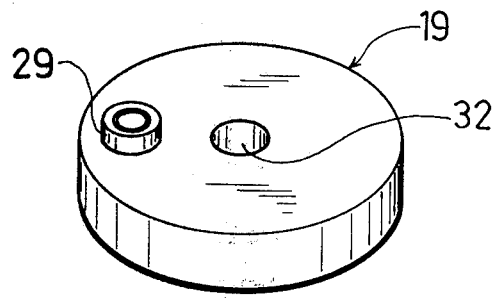
FIG. 2 shows a perspective view of the cartridge.
Figure 3:
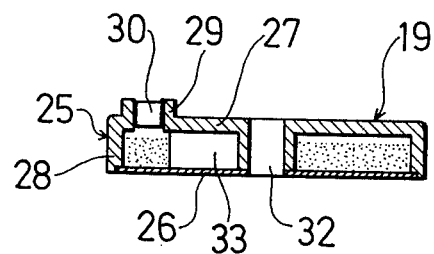
FIG. 3 shows a cross section through the cartridge.

The cartridge 19, is, which is best evident from FIGS. 2 and 3, formed as a thin, cylindrical shell, preferably manufactured of synthetic resin. In the embodiment shown it comprises two portions 25 and 26, respectively. The firstmentioned portion, 25, is preferably manufactured of a material, which is not noticeably affected by the combustion of the powder, and it forms the outwardly turned end wall 27 and the envelope wall 28 of the shell. The diameter of this portion permits the envelope wall to rest against the mouth of the portion of the housing enclosing the passage containing the piston 15.

The other portion 26, of the shell is intended to form a wadding and is welded to the inside of the envelope wall of the first mentioned portion 25, along its periphery. The volume of the shell is selected to receive a powder charge sufficient to provide the necessary driving force to open the thickest-walled pipe actual for the diameter range to be covered by the particular T-joint fitting. It is not necessary that the powder charge fills the shell completely, and within a shell of given size may be included charges of different magnitudes. The shell is thus a unitary member, and the charges may be easily differentiated for instance by selecting various colour for the outer wall portion 27.

An important feature is that the outer wall portion 27 is provided with a socket 29 for a firing cap 30, which is located eccentrically with respect to the center of the shell. The cup-shaped nut 20 is provided with a recess 31 in its inward bottom wall, adapted to receive the cap socket 29.

Portion 15 of the housing and the nut 20 are designed so as to permit the cartridge to be brought to the edge of portion 15. The length of piston 16 is selected so its back face is about level with the edge of portion 15, when its front edge 17 rests against the envelope wall of pipe 10. Due to the eccentric location of cap socket 29, the cartridge will rotate together with the nut 20, until a final position is reached, in which there is an insignificant space between the wadding wall 26 of the shell and the back face of the piston, the firing cap being always in an accessible position.

In FIGS. 2 and 3 cartridge 19 is provided with a centrally located passage 32. This made with an aim to reduce the number of items to be kept in store. There are T-joint fittings, corresponding to the one shown in FIG. 1, where the piston 16 is provided with a shaft, which sealingly passes through the nut, and which, when the piston has been brought to its final position may be used to rotate the piston, thus making possible a control, or a cutting-off of the flow of fluid to the branch pipe. On many occasions such control is unnecessary, but advantageously the cartridge is formed so it can be used with pistons with, as well as without, a rotating rod.

The large area, which is immediately made available at the piston for the gases, provides favourable conditions for the cutting through the wall of pipe 10. An unintentional firing on the shell, when fitted in the housing while this is not mounted at a pipe, will of course result in a displacement of the piston, but as this will not meet an immediate resistance a comparatively calm expansion of the gases occurs, and the piston will be brought to rest against bottom 22 of the passage.

In order to ensure a safe initiation of the firing cap the outer wall portion 27 of the shell can be stiffened by an internal, radial flange 33 extending from the bushing enclosing the central passage 32 to the region below socket 29.

What I claim is:

1. In a T-joint fitting for attachment to and making a communication with an existing length of pipe, said fitting comprising a housing having a first semi-cylindrical face for engaging a portion of the circumference of said pipe, a clamping member having a second semi-cylindrical face for engaging an opposite portion of said circumference, as well as bolts for forcing said housing and said clamping member into sealing engagement with said pipe at a selected spot thereon, a first passage in said housing, extending transversely with respect to said semi-cylindrical surface and extending to both sides thereof, a second passage in said housing located at an angle to and communicating with said first passage, a piston defined by a front cutting edge and a back face, located in said first passage for axial displacement therein, said piston having a transversely extending passage, the improvement comprising, external threads on an open ended portion of said housing enclosing said first passage, the length of said portion being selected so with respect to the length of said piston, that said front cutting edge thereof will rest upon the outer surface of said piping, when the back face of said piston is about level with the open end of said portion of the housing, an explosive charge enclosed in a disc-shaped shell, said shell having a diameter larger than the diameter of said first passage and being provided with a socket for a firing cap, eccentrically located in the face of said shell to be turned outwards in use, and a cup shaped nut having internal threads mating with the external threads on said portion of the housing and having in its inward bottom face a recess for the reception of said firing cap containing socket, said recess being further adapted to make said cap accessible to a firing pin.

2. The T-joint fitting according to claim 1, in which the shell is manufactured in two parts, comprising a first part being made of material which is not seriously affected by the combustion of the charge, and which forms an envelope outward wall with the cap socket and an envelope side wall open inwardly and, a second part closing the opening of said envelope and being fitted to the inner surface of said envelope side wall and serving as wadding.

3. The T-joint fitting according to claim 1, in which the shell is provided with an axial, centrally located passage.

* * * * *